United States Patent [19]

Schievelbein

[11] 3,932,583

[45] Jan. 13, 1976

[54] METHOD OF REMOVING HYDROGEN SULFIDE FROM A GAS CONTAINING CARBON DIOXIDE

[75] Inventor: Vernon Hugo Schievelbein, Houston, Tex.

[73] Assignee: Texaco Inc., New York, N.Y.

[22] Filed: Apr. 22, 1974

[21] Appl. No.: 462,907

Related U.S. Application Data

[63] Continuation-in-part of Ser. No. 263,911, June 19, 1972, abandoned.

[52] U.S. Cl................................. 423/232; 423/573
[51] Int. Cl.².......................................... B01D 53/34
[58] Field of Search ........... 423/210, 220, 228, 232, 423/224, 233, 573; 55/73

[56] References Cited
UNITED STATES PATENTS

| | | | |
|---|---|---|---|
| 1,436,196 | 11/1922 | Ramsburg | 423/232 |
| 1,732,905 | 10/1929 | Morgan et al. | 423/232 |
| 1,918,153 | 7/1933 | Wagner | 423/232 |

FOREIGN PATENTS OR APPLICATIONS

| | | | |
|---|---|---|---|
| 1,182,255 | 2/1970 | United Kingdom | 55/73 |

*Primary Examiner*—Earl C. Thomas
*Attorney, Agent, or Firm*—T. H. Whaley; C. G. Ries; Kenneth R. Priem

[57] ABSTRACT

A process wherein hydrogen sulfide present in a gas mixture comprising hydrogen sulfide and carbon dioxide is preferentially removed from the gas stream into an aqueous solution where the hydrogen sulfide is oxidized. The aqueous solution has dissolved therein bicarbonate ions, transition metal ions, and oxygen.

16 Claims, No Drawings

METHOD OF REMOVING HYDROGEN SULFIDE FROM A GAS CONTAINING CARBON DIOXIDE

This is a Continuation-in-Part of application, Ser. No. 263,911, filed June 19, 1972, and now abandoned.

BACKGROUND OF THE INVENTION

This invention is concerned with the removal of hydrogen sulfide from a mixture of gases.

In many industrial processes and in the oil production industry, concern over pollution has compelled the more complete removal of harmful and/or offensive components from effluent gas streams before release into the atmosphere. Also, many chemical processes demand gas streams of specific composition.

The problem is to separate gases from each other efficiently and economically and to dispose of any unwanted gas efficiently and economically.

A gas which is of particular concern as a pollutant is hydrogen sulfide. Hydrogen sulfide and other sulfur compounds are both offensive and harmful. Hydrogen sulfide, for example, can cause corrosion problems and is also toxic in concentrated amounts. Even in considerably less than toxic concentrations, hydrogen sulfide has an offensive odor.

The removal of hydrogen sulfide is complicated by the fact that it often occurs as a component in a mixture of gases. One frequently occurring gas mixture contains hydrogen sulfide and carbon dioxide along with perhaps other gases. Carbon dioxide is usually tolerated and not considered as a pollutant. Thus, it may be released into the atmosphere. There are many processes which will remove both hydrogen sulfide and carbon dioxide from gas streams and a few which may be made to preferentially remove hydrogen sulfide. Some of these processes use, in combination or alone, monoethanolamine and diethanolamine. Others use propylene carbonate, a combination of an alkali metal carbonate and an alkali metal arsenate, and others use a mixture of tetrahydrothiophene-1, 1-dioxide and alkanolamines. It is also known in the art to use an aqueous basic solution to remove both carbon dioxide and hydrogen sulfide since both gases increase in solubility in aqueous solutions as the pH of the solution rises.

Details of several prior art processes for treating mixtures of hydrogen sulfide and other gases are disclosed in the literature. See for example, "The Oil and Gas Journal", Aug. 14, 1967, p. 131; "The Oil and Gas Journal", June 3, 1968, p. 90; and "Chemical Engineering", May 15, 1972, p. 66.

These prior art processes have disadvantages such as requiring addition of fresh reagents as the active ingredients are used up in the process or regeneration of these active ingredients. Also, the pH of some systems is required to be maintained at a predetermined level requiring constant surveillance and manipulation. Also, many prior art processes do not adequately provide for disposal of the hydrogen sulfide after it is in solution.

Processes which provide for catalytic oxidation of hydrogen sulfide dissolved in an aqueous medium are disclosed in U.S. pat. No. 3,576,738 and applications Ser. No. 199,780 filed Nov. 17, 1971; Ser. No. 199,777 filed Nov. 17, 1971; and Ser. No. 199,779 filed Nov. 17, 1971. However, these processes are not directed to separating hydrogen sulfide from a mixture of gases but are concerned only with hydrogen sulfide already present in an aqueous solution.

The present invention overcomes many problems of the prior art by providing a process whereby hydrogen sulfide is at once preferentially absorbed from a gaseous mixture comprising hydrogen sulfide and carbon dioxide into an aqueous solution and then the hydrogen sulfide is catalytically oxidized to elemental sulfur while in solution.

SUMMARY OF THE INVENTION

The invention is a process wherein hydrogen sulfide present in a gas mixture comprising hydrogen sulfide and carbon dioxide is preferentially removed from the gas stream and converted to elemental sulfur. The process comprises treating the gas mixture with an aqueous solution consisting of dissolved bicarbonate ions, ions of a transition metal or metals, and dissolved oxygen. The aqueous solution may also contain inert salts. The bicarbonate ions should be present in sufficient concentration to establish an equilibrium imbalance to prevent substantial dissolution of carbon dioxide. Wagner's U.S. Pat. No. 1,918,153 indicates that the reaction $$NaHS + CO_2 + H_2O \rightleftarrows NaHCO_3 + H_2S$$

proceeds from left to right due to the fact that carbonic acid gas is a slightly stronger acid than hydrogen sulfide. I have found that contrary to the allegation of Wagner the above reactions will proceed from right to left under conditions which maintain a high level of concentration of bicarbonate ions in the aqueous medium at atmospheric pressure. Required bicarbonate concentrations are presented hereinafter. Next, the dissolved hydrogen sulfide is catalytically oxidized to elemental sulfur by dissolved transition metal ions and dissolved oxygen.

In one typical embodiment of this invention the gas mixture comprising hydrogen sulfide and carbon dioxide is treated with one solution containing dissolved bicarbonate ions, dissolved transition metal ions and dissolved oxygen. Since the catalytic reaction of hydrogen sulfide to sulfur takes place rapidly, the dissolution of hydrogen sulfide precedes the catalytic reaction by only a very short time. In another typical embodiment of this invention the dissolution of the hydrogen sulfide takes place first and the aqueous solution containing the dissolved gas is transferred to another facility where the catalytic oxidation of hydrogen sulfide to sulfur takes place.

The Dissolution of Hydrogen Sulfide

The process of this invention is particularly applicable to the situation where hydrogen sulfide and carbon dioxide are in a gas mixture and it is desired to be rid of the hydrogen sulfide while the carbon dioxide may be allowed to escape.

The process of this invention is of particular advantage where the concentration of carbon dioxide is relatively high with respect to the concentration of hydrogen sulfide. This is so because in conventional basic systems the carbon dioxide is adsorbed in proportion to its concentration and reduces the pH of the system to the point that hydrogen sulfide is no longer absorbed necessitating the addition of more basic material to the aqueous solution. The process of the present invention prevents major fluctuations in the pH of the aqueous solution by the presence of bicarbonate ions in the aqueous medium. While there is no intention to limit the success of the present invention to a specific mechanism the following is believed to be explanatory of the operative chemical action of the dissolution step in the present invention.

When carbon dioxide dissolves in water the following equilibrium reaction takes place:
$$CO_2 + H_2O \rightleftarrows H_2CO_3 \rightleftarrows H^+ + HCO_3^-$$
If excess bicarbonate ion is present in the aqueous solution, as in this invention, the equilibrium solubility of carbonic acid ($H_2CO_3$) decreases and, consequently, the carbon dioxide is reduced in solubility and the pH of the solution remains stable.

The solubility in water of hydrogen sulfide is governed by the following equilibrium:
$$H_2S \rightleftarrows H^+ + HS^-$$
The equilibrium solubility of hydrogen sulfide decreases as the pH of the solution decreases. Since the presence of the bicarbonate ion, in effect, keeps the pH high and prevents carbon dioxide from dissolving, the hydrogen sulfide is preferentially absorbed into the aqueous solution. That is, a greater percentage of hydrogen sulfide than carbon dioxide is dissolved.

The dissolution step of the invention entails contacting the gas containing hydrogen sulfide and carbon dioxide with a bicarbonate rich aqueous solution. The contact may be carried out in any conventional gas liquid contactor. For example, the aqueous solution may be sprayed over the gas mixture or a packed tower may be used. The gas may also be bubbled through a vessel containing the aqueous solution of bicarbonate ions. The particular manner of contacting the aqueous solution of bicarbonate ions and the hydrogen sulfide-carbon dioxide containing gas is left to the choice of one skilled in the art. Therefore, any conventional manner of contacting found convenient and efficient is suitable for the operation of this invention. It is within the capability of one skilled in the art to choose a method efficient enough to remove the required amount of hydrogen sulfide from a given stream of gas input.

The bicarbonate ions in the aqueous solution may be derived from any one or a mixture of water soluble salts of bicarbonate anions such as ammonium bicarbonate, sodium bicarbonate, potassium bicarbonate, magnesium bicarbonate, calcium bicarbonate and transition metal salts of the bicarbonate anions to name only a few. Sodium and potassium bicarbonate salts are preferred because they are very soluble in water and are extremely stable and do not tend to form mineral scale on the surface of the gas-liquid contactor and associated equipment.

If a bicarbonate salt as above is used, the bicarbonate ions are present immediately upon dissolution of the salt in the water and, therefore, the selectivity of the solution for hydrogen sulfide will be established from the beginning of carbon dioxide-hydrogen sulfide contact.

Alternatively, in another embodiment of this invention water soluble carbonate salts of various cations may be used in the process of this invention. In this embodiment the water soluble carbonate salts are dissolved in an aqueous medium and are contacted with a source of carbon dioxide to convert the carbonate ions to bicarbonate ions according to the following reaction:
$$CO_3^= + CO_2 + H_2O \rightleftarrows 2HCO_3^-$$
The resulting solution of bicarbonate ions will then selectively absorb hydrogen sulfide.

The carbon dioxide to convert the carbonate ion to bicarbonate ion may be in pure form in which case a short preconditioning step comprising conversion of carbonate to bicarbonate ions will precede the process of separating hydrogen sulfide from a mixture of hydrogen sulfide and carbon dioxide. However, since the conversion of carbonate to bicarbonate ions is very rapid the gas mixture of hydrogen sulfide and carbon dioxide may be used as a source of carbon dioxide. Thus eliminating the need for pretreatment with a pure carbon dioxide source.

In yet another embodiment of this invention water soluble acid phosphate salts of ammonia, alkali metals and alkaline earth metals may be used. For example, ammonium orthophosphate (di- and tribasic), sodium phosphate (di- and tribasic), potassium phosphate (di- and tribasic), calcium phosphate (di- and tribasic), magnesium phosphate (di- and tribasic) and barium phosphate (di- and tribasic) are suitable.

When these phosphate salts are used, carbon dioxide is absorbed in the solution for a time forming bicarbonate ions. The process may proceed as follows for a typical salt:
$$Na_2HPO_4 \rightleftarrows 2Na^+ + HPO_4^=$$
$$HPO_4^= + H_2O \rightleftarrows H_2PO_4^- + OH^-$$
$$OH^- + CO_2 \rightleftarrows HCO_3^-$$
Thus, the bicarbonate ion is formed which will inhibit further carbon dioxide dissolution.

Other sources of bicarbonate ions may occur to those skilled in the art without departing from the scope of this invention.

Inert or neutral salts, that is salts which do not impart an acidic or basic character to an aqueous solution may also be present along with the bicarbonate salts in the aqueous solution of my invention. However, salts which do impart a basic or acidic character to an aqueous solution such as carbonate salts are not acceptable in the aqueous solution of my invention except in trace amounts which have minuscule effect on the solution.

The concentration of bicarbonate forming salt required must be large enough to establish an equilibrium imbalance which will prevent carbon dioxide from dissolving in the aqueous solution in substantial amounts. The higher the concentration of bicarbonate ions, the more readily hydrogen sulfide will be dissolved. The maximum concentration of bicarbonate ions is dictated by practical considerations such as the maximum solubility of the particular bicarbonate salt, the most desirable concentration of hydrogen sulfide in the aqueous solution from the liquid-gas contactor, the desired liquid circulation rate through the liquid-gas contactor and desired scrubbing efficiency. Bicarbonate ion containing solutions having from 0.01 g-moles/l to 0.25 g-moles/l of solubilized bicarbonate or equivalent amount of other bicarbonate salts are preferred.

The dissolution step of the process of this invention may be operated at ambient conditions of temperature and pressure. Severe conditions are not necessary for the successful operation of this invention.

The Catalytic Oxidation of Hydrogen Sulfide

Once dissolved, the hydrogen sulfide is free to react with dissolved oxygen to form elemental sulfur in the second broad step of this invention. As pointed out earlier, both the dissolution of hydrogen sulfide and the oxidation of hydrogen sulfide may take place in the same facility, such as a liquid filled vessel. In this case, the dissolution and oxidation of hydrogen sulfide will be occurring simultaneously as the process proceeds. In another possible case mentioned, the hydrogen sulfide dissolution step takes place in a facility separate from the oxidation step. In either case the oxidation step must take place in an aqueous solution containing in addition to the hydrogen sulfide, dissolved transition metal ions as catalyst and dissolved oxygen.

The preferred catalyst for the reaction is a soluble transition metal catalyst, more specifically an ion of a transition metal is preferred. The usual form of such a catalyst is a salt. Soluble salts of nickel, cobalt, manganese, copper and iron, for example, are suitable for the operation of my invention.

The amount of catalyst to be used must be large enough to impart catalytic activity and promote the reaction between hydrogen sulfide and oxygen. Amounts as low as 1 part by weight of catalyst per 2000 parts of hydrogen sulfide to be treated may be used. Any amount up to the limit of solubility of the catalyst in the aqueous solution may be used. As a practical matter amounts much above 1 part of catalyst per 20 parts of hydrogen sulfide may not appreciably improve catalytic activity. It is preferred to use from about 1 part of catalyst to 50 parts of hydrogen sulfide to about 1 part of catalyst to about 200 parts of hydrogen sulfide.

The water must contain dissolved oxygen in an amount at least sufficient to stoichiometrically convert all of the dissolved hydrogen sulfide to elemental sulfur. An excess may be required to insure more complete reaction. The oxygen may be dissolved in the aqueous solution in any convenient manner. For example, the oxygen may be bubbled through the aqueous solution or the solution may be aerated by dividing it into a fine mist or spray and passing it through a source of oxygen. Any number of ways to dissolve oxygen in an aqueous medium are available and the method used is not critical to the process of this invention.

The source of oxygen may be any convenient source including, but not limited to, pure oxygen and air.

The process of my invention may be carried out at ambient conditions of temperature and pressure, if desired. Severe conditions are not required for the process of this invention. As a result, the invention may be practiced in inexpensive equipment.

The contact time between the hydrogen sulfide/carbon dioxide gas and the aqueous solution must be adequate for equilibrium to be obtained so that a maximum amount of hydrogen sulfide will be dissolved. In general, with adequate mixing, more than twenty seconds are seldom needed to reach equilibrium and equilibrium is often reached in a second or less. The necessary contact time is largely dependent on many other variables such as bubble size and mixing efficiency. The greater the efficiency the shorter the contact time may be. These are engineering details to be included in the design of each unit.

EXPERIMENTAL

Example 1

This example illustrates the ability of an unaerated aqueous solution of bicarbonate ions to selectively remove hydrogen sulfide from a mixture of hydrogen sulfide and carbon dioxide.

An aqueous solution was passed through the top of the contactor and out the bottom. A two component gas consisting of 96.33% carbon dioxide and 3.67% hydrogen sulfide was bubbled into the bottom of the contactor in a counter current manner to the flow of the aqueous solution.

Two runs were made. In the first run the aqueous solution contained no bicarbonate. In the second run the aqueous solution contained sodium bicarbonate. The contact time of the gas and liquid was about 3 seconds in both runs.

The results indicate that the addition of bicarbonate ion increased the ability of the aqueous solution to dissolve hydrogen sulfide in preference to carbon dioxide.

| Run | Composition of gas before treatment | | Composition of gas after treatment | | Content of aqueous solution contacting 3.6% $H_2S$ and 96.33% $CO_2$ |
|---|---|---|---|---|---|
| | $H_2S$ | %$CO_2$ | %$H_2S$ | %$CO_2$ | |
| 1 | 3.67 | 96.33 | 1.8 | 98.2 | — |
| 2 | 3.67 | 96.33 | 0.76 | 99.24 | Sodium bicarbonate |

Example 2

A contactor comprising a vertical glass tube filled with glass beads was used as follows:

An aqueous solution was passed through the top of the contactor and proceeded through the contactor and out the bottom. A gas comprising 95.5% carbon dioxide and 4.5% hydrogen sulfide was bubbled into the bottom of the contactor in a counter current manner to the flow of the aqueous solution.

Five runs were made. In the first the aqueous solution was aerated containing only oxygen. In the second and third runs the aqueous solution contained oxygen and sodium bicarbonate. In the fourth run the aqueous solution contained oxygen and nickel chloride catalyst. In the fifth run the aqueous solution contained oxygen, a nickel chloride catalyst and sodium bicarbonate. The contact time between the sour gas and aqueous solution was approximately 2 seconds.

As is evident, the ability of the aqueous solutions to remove hydrogen sulfide increased from runs one to five.

| Run | $H_2S$ of gas before treatment | $H_2S$ of gas after treatment | Content of aqueous solution contacting 95.5% carbon dioxide, 4.5% hydrogen sulfide gas |
|---|---|---|---|
| 1 | 4.5 | 2.92 | oxygen |
| 2 | 4.5 | 2.05 | oxygen, sodium bicarbonate |
| 3 | 4.5 | 2.02 | oxygen, sodium bicarbonate |
| 4 | 4.5 | 1.70 | oxygen, nickel chloride |
| 5 | 4.5 | 0.27 | oxygen, nickel chloride, sodium bicarbonate |

Example 3

Field Data

A process for oxidizing gaseous hydrogen sulfide with an aqueous solution and air was operated on a pilot scale at a gas point. In this process, an aqueous solution containing bicarbonate ion alkalinity ($HCO_3 {-} HCO_3 {-}$) was used to absorb hydrogen sulfide from acid gas. The absorbed hydrogen sulfide was oxidized to elemental sulfur. A nickel catalyst was used to promote the hydrogen sulfide-oxygen reaction. The absorption solution was prepared by adding soda ash ($Na_2CO_3$) to fresh water and bubbling gaseous carbon dioxide (from acid gas) through the solution until all of the soda ash was converted to sodium bicarbonate.

The Pilot Unit

Acid gas from amine regeneration was passed into a 2.4 m (8 ft.) diameter by 8.5 m (28 ft.) tall absorption-reaction vessel which was fabricated from a heater treater from which the fire tubes and spreader plate has been removed. The acid gas was bubbled into the solution contained within the vessel through 2.54 cm (1 in.) pipe perforated with eight, 7.9 mm (5/16 in.) holes. Air from a blower was passed through an orifice plate flowmeter and into the reaction vessel through 2.54 cm (1 in.) pipe perforated with thirteen, 7.9 mm (5/16 in.) holes. Valves and a pressure regulator were used to control the air and acid gas flow rates; 5.08 cm (2 in.) pipe was used as acid gas and air flowlines.

The solution flowed from the absorption-reaction vessel to a 3.0 m (10 ft) diameter by 4.6 m (15 ft) tall settling vessel. Piping and valving were arranged so that the solution could be drained from the bottom, or 3.2 m (10.5 ft), 4.4 m (14.5 ft), 5.6 m (18.5 ft) or 6.8 m (22.5 ft) levels. Solution from the settling vessel was recycled to the reaction vessel by a positive displacement pump. Sludge from the settling vessel was drained into 0.21 m³ (55 gal) drums.

A nickel chloride (catalyst) solution was added directly to the absorption-reaction vessel pump.

Test Procedure

Approximately 40 m³ (250 bbls) of fresh water, 227 kg (500 lbs) of soda ash and 0.45 kg (1 lb) of catalyst (nickel chloride hexahydrate) were added to the test unit. The catalyst solution for the chemical metering pump was prepared by adding 0.03 kg/m³ (0.25 lb/gal) of nickel chloride hexahydrate to fresh water. The circulation pump was started and drain valves were adjusted so that the depth of solution in the reaction vessel was 5.6 m (18.5 ft). Acid gas, air and catalyst flows to the absorption-reaction vessel were then started.

Laboratory test data indicated that solid sulfur and spent catalyst need not be purged from the solution more than once per day; consequently, attempts were made to run the solution circulation pump so that the daily solution circulation rate was equal to the volume contained in the reaction vessel, 25.4 m³ (160 bbls), when the solution depth was 5.6 m (18.5 ft). In practice, the pump would not operate at such a low circulation rate. In all tests prior to May 19, the circulation rate was 2.0-2.6 m³/h (300-400 bbls/day); after May 19, the circulation pump was run only 30 min/day and, during pumping periods, solution from the reaction vessel was drained through the bottom valve.

Solution samples, from the absorption-reaction vessel, were taken once or twice daily to determine free carbon dioxide, bicarbonate ion alkalinity (*Analysis of Oil Field Water, API RP45*, Second Edition, Methods 3.5 and 2.2) and pH. The vent gas was analyzed once or twice daily using the Unico Hazardous Gas Detector; the acid gas was analyzed for hydrogen sulfide content by the Tutweiler method.

Test Results

The acid gas was sampled on three occasions and found to contain 0.041 (4.1% v/v), 0.046 (4.6% v/v) and 0.042 m³/m³ (4.2% v/v) hydrogen sulfide. The pH of the solution ranged from 6.4 to 7.7 and increased with the bicarbonate ion alkalinity. The free carbon dioxide concentration varied from 0.156 to 0.360 kg/m³ (156-360 mg/l). The hydrogen sulfide content in the vent gas and the bicarbonate ion alkalinity in the solution under test conditions are reported in Tables I and II.

Discussion of Test Results

In all subsequent calculations and discussions, acid gas from the gas treating plant was assumed to contain 0.043 m³/m³ (4.3%) hydrogen sulfide. This value was derived by averaging the values obtained in the three acid gas analyses.

The gas vented from the absorption-reaction vessel was a mixture of sweetened acid and air. Therefore, to calculate the percentage hydrogen sulfide removed from the acid gas by using the vent gas and acid gas hydrogen sulfide concentrations, allowance was made for dilution of gas with air. The equation used in the calculations was as follows (Tables I and II):

$$\% \text{ H}_2\text{S removed} = 100 - \left[ \frac{\text{ppm H}_2\text{S in vent gas}}{4.3} \times 10^{-2} \times \frac{(\text{acid gas} + \text{air rates})}{\text{acid gas rate}} \right]$$

Laboratory test data showed that the primary hydrogen sulfide oxidation product is sulfur, but thiosulfate ions and acid (H⁺) were also formed by the following secondary reaction:

$$2\text{H}_2\text{S} + 2\text{O}_2 \rightarrow 2\text{H}^+ + \text{S}_2\text{O}_3^{2-} + \text{H}_2\text{O}$$

Acid neutralized bicarbonate ion alkalinity according to the following reaction:

$$\text{H}^+ + \text{HCO}_3^- \rightarrow \text{H}_2\text{O} + \text{CO}_2$$

Supplementary soda ash was added to the solution which was rapidly converted to bicarbonate to replace neutralized bicarbonate ion alkalinity.

The soda ash consumption rates in the hourly tests varied from 0 to 0.072 kg/m³ (0 to 4.5 lbs/MSCF). The latter rate was observed in the first test only and the high rate was probably due, in part, to alkalinity losses by calcium and magnesium carbonate precipitation due to the hardness of the water used.

Tests 1-13 from May 2 to May 8 showed that 0.96-0.98 kg/kg (96-98%) hydrogen sulfide was removed when (1) the air/acid gas flow rate ratio was one, (2) the acid gas treating rate was 76 m³/h (45 ft³/min), and (3) the solution depth was 5.6 m (18.5 ft). Decreasing the air/acid gas flow rate ratio from 3 to 1 increased the percentage hydrogen sulfide removed.

Tests 13-18 demonstrated that when the air/acid gas ratio was about one and the acid gas treating rate was 70 to 75 m³/h (41-44 ft³/min), the percentage hydrogen sulfide removed decreased with solution depth. Tests from May 15 to May 18 demonstrated that the percentage hydrogen sulfide decreased only slightly with solution depth provided that the air rate per surface area of solution, 12-14 m³/h/m² (0.6-0.7 ft³/min/ft²), and acid gas rate per volume of solution, 1.7-1.9 m³/h/m³ (0.18-0.19 ft³/min/bbl), remained constant.

When the acid gas to air flow rate ratio was about one, the percentage hydrogen sulfide removed decreased only slightly as the flow rate increased (Table II).

TABLE I
PILOT TEST RESULTS (U.S. CUSTOMARY)

| TEST | TIME | AIR RATE (Ft³/min) | ACID GAS RATE (Ft³/min) | CATALYST RATE (Lbs/day) | SOLUTION DEPTH (Ft) | SOLUTION TEMP (°F) | $H_2S$ IN VENT GAS (ppm) | BICARBONATE ION ALKALINITY (mg/l) | $H_2S$ REMOVED % |
|---|---|---|---|---|---|---|---|---|---|
| (1) 5-2 | 2200 | 77 | 27 | 1 | 18.5 | 80 | 400 | 4,050 | 96 |
| (2) 5-3 | 0730 | 77 | 27 | 1 | 18.5 | 77 | 1,100 | 3,470 | 90 |
| (3) 5-3 | 2000 | 74 | 40 | 1 | 18.5 | 84 | 800 | 4,310 | 95 |
| (4) 5-4 | 0830 | 74 | 40 | 2 | 18.5 | 80 | — | 3,650 | — |
| (5) 5-4 | 1930 | 68 | 44 | 1.3 | 18.5 | 90 | 500 | 3,100 | 97 |
| (6) 5-5 | 0830 | 54 | 45 | 1.5 | 18.5 | 88 | 2,700 | 2,220 | 86 |
| (7) 5-5 | 1830 | 55 | 45 | 1.3 | 18.5 | 90 | 500 | 5,310 | 97 |
| (8) 5-6 | 0830 | 55 | 44 | 1.3 | 18.5 | 84 | 1,100 | 4,050 | 94 |
| (9) 5-6 | 1830 | 55 | 45 | 2.0 | 18.5 | 88 | 400 | 3,630 | 98 |
| (10) 5-7 | 0730 | 52 | 45 | 2.0 | 18.5 | 83 | 900 | 3,260 | 96 |
| (11) 5-7 | 1700 | 41 | 45 | 2.0 | 18.5 | 91 | 500 | 2,900 | 98 |
| (12) 5-8 | 0830 | 42 | 44 | 1.5 | 18.5 | 90 | 400 | 2,410 | 98 |
| (13) 5-8 | 1830 | 40 | 42 | 2.0 | 14.5 | 93 | 850 | 2,210 | 96 |
| (14) 5-9 | 0900 | 40 | 42 | 2.0 | 14.5 | 91 | 7,000 | 2,930 | 68 |
| (15) 5-9 | 1530 | 39 | 41 | 2.0 | 10.5 | 98 | 9,000 | 2,660 | 59 |
| (16) 5-10 | 0900 | 39 | 41 | 2.0 | 10.5 | 91 | 14,000 | 2,340 | 37 |
| (17) 5-10 | 1415 | 40 | 42 | 2.0 | 14.5 | 91 | 5,000 | 2,300 | 77 |
| (18) 5-11 | 0515 | 40 | 42 | 2.0 | 14.5 | 93 | 7,500 | 1,870 | 66 |
| (19) 5-15 | 0800 | 26 | 31 | 3.3 | 18.5 | 78 | 150 | 6,700 | 99.4 |
| (20) 5-15 | 1930 | 31 | 31 | 2.0 | 18.5 | 75 | 85 | 6,750 | 99.6 |
| (21) 5-16 | 0730 | 32 | 26 | 3.5 | 18.5 | 73 | 45 | 6,690 | 99.8 |
| (22) 5-17 | 1330 | 30 | 24 | 0.5 | 14.5 | 82 | 250 | 6,420 | 98.7 |
| (23) 5-17 | 1900 | 30 | 25 | 1.0 | 14.5 | 86 | 230 | 6,150 | 98.8 |
| (24) 5-18 | 0800 | 36 | 17 | 1.0 | 10.5 | 82 | 500 | 5,860 | 96.4 |
| (25) 5-18 | 2000 | 20 | 21 | 1.0 | 18.5 | 100 | 120 | 5,730 | 99.5 |
| (26) 5-19 | 0800 | 18 | 18 | 1.0 | 18.5 | 90 | 100 | 5,920 | 99.5 |
| (27) 5-19 | 1930 | 31 | 31 | 1.0 | 18.5 | 100 | 100 | 5,310 | 99.5 |
| (28) 5-20 | 0730 | 34 | 31 | 1.0 | 18.5 | 95 | 230 | 5,130 | 98.9 |
| (29) 5-20 | 1845 | 32 | 31 | 0.4 | 18.5 | 102 | 260 | 4,830 | 98.8 |
| (30) 5-21 | 0610 | 28 | 31 | 0.8 | 18.5 | 93 | 500 | 4,470 | 97.8 |
| (31) 5-21 | 1830 | 41 | 37 | 0.8 | 15.5 | 105 | 300 | 4,030 | 98.5 |
| (32) 5-22 | 1820 | 29 | 27 | 0.5 | 18 | — | 20 | 4,770 | 99.9 |
| (33) 5-23 | 1810 | 30 | 30 | 0.7 | 18 | — | 160 | 7,120 | 99.3 |
| (34) 5-24 | 2035 | 30 | 30 | 0.7 | 18 | — | 3 | 6,520 | 99.9 |
| (35) 5-25 | 1935 | 30 | 30 | 0.8 | 18 | — | 14 | 5,880 | 99.9 |
| (36) 5-26 | 1730 | 30 | 30 | 0.8 | 18 | — | 68 | 5,520 | 99.8 |
| (37) 5-27 | 1715 | 30 | 30 | 0.8 | 18 | — | 120 | 4,790 | 99.4 |
| (38) 5-28 | 1715 | 30 | 30 | 0.8 | 18 | — | 110 | 3,970 | 99.5 |

TABLE II

Hydrogen Sulfide Removal as a Function of Acid Gas Rates

| No. of Tests | Ave. Air Rates m³/hr | Ave. Air Rates Ft³/min | Ave. Acid Gas Rates m³/hr | Ave. Acid Gas Rates Ft³/min | % $H_2S$ Removed |
|---|---|---|---|---|---|
| 2 | 71 | 42 | 76 | 45 | 98 |
| 14 | 51 | 30 | 51 | 30 | 99.4 |
| 2 | 32 | 19 | 34 | 20 | 99.5 |

I claim:

1. A process for preferentially removing hdyrogen sulfide from a gas mixture comprising hydrogen sulfide and carbon dioxide and converting the hydrogen sulfide to elemental sulfur comprising
    treating said gas mixture at atmospheric pressure with an aqueous solution consisting of inert salts, dissolved bicarbonate ions in sufficient concentration to establish an equilibrium imbalance to prevent substantial dissolution of carbon dioxide, a catalytic quantity of ions of a transition metal and dissolved oxygen in an amount sufficient to stoichiometrically convert all of the hydrogen sulfide to elemental sulfur.

2. A process as in claim 1 wherein the bicarbonate ions result from the dissolution of a soluble alkali metal bicarbonate and the transition metal ions result from the dissolution of nickel chloride.

3. A process as in claim 1 wherein the bicarbonate ions result from the dissolution of from about 1 to about 20 gram moles per liter of a soluble alkali metal bicarbonate and the transition metal ions result from the dissolution of from about one part by weight of a soluble transition metal salt per 50 parts by weight of hydrogen sulfide to about 1 part by weight of a soluble transition metal salt to about 200 parts by weight of hydrogen sulfide.

4. A process as in claim 3 wherein the soluble alkali metal bicarbonate is sodium bicarbonate and the soluble transition metal salt is nickel chloride.

5. A process as in claim 1 wherein the bicarbonate ions result from the reaction of carbonate ions and carbon dioxide in an aqueous medium.

6. A process for converting hydrogen sulfide to elemental sulfur wherein the hydrogen sulfide is originally present in a gas mixture consisting of hydrogen sulfide and carbon dioxide said process comprising
    treating the gas mixture comprising hydrogen sulfide and carbon dioxide at atmospheric pressure with an aqueous solution consisting of inert salts, dissolved bicarbonate ions in sufficient concentration to establish an equilibrium imbalance to prevent substantial dissolution of carbon dioxide, a catalytic quantity of ions of a transition metal and dissolved oxygen.

7. A process for preferentially removing hydrogen sulfide from a gas mixture comprising hydrogen sulfide and carbon dioxide and converting the hydrogen sulfide to elemental sulfur comprising
    treating the gas mixture at atmospheric pressure with an aqueous solution consisting of inert salts, dissolved bicarbonate ions in sufficient concentration to establish an equilibrium imbalance to prevent substantial dissolution of carbon dioxide and treating the said aqueous solution containing hydrogen sulfide with oxygen and a catalytic quantity of transition metal ions dissolved in an aqueous medium to convert the hydrogen sulfide to elemental sulfur.

8. A process for preferentially removing hydrogen sulfide from a gas mixture consisting of hydrogen sulfide and carbon dioxide and converting the hydrogen sulfide to elemental sulfur comprising treating said gas mixture at atmospheric pressure with an aqueous solution consisting of inert salts, dissolved bicarbonate ions in sufficient concentration to establish an equilibrium imbalance to prevent substantial dissolution of carbon dioxide, a catalytic quantity of ions of a transition metal and dissolved oxygen.

9. A process for preferentially removing hydrogen sulfide from a gas mixture comprising hydrogen sulfide and carbon dioxide and converting the hydrogen sulfide to elemental sulfur comprising treating said gas mixture at atmospheric pressure with an aqueous solution consisting of dissolved bicarbonate ions in sufficient concentration to establish an equilibrium imbalance to prevent substantial dissolution of carbon dioxide, a catalytic quantity of ions of a transition metal and dissolved oxygen in an amount sufficient to stoichiometrically convert all of the hydrogen sulfide to elemental sulfur.

10. A process as in claim 9 wherein the bicarbonate ions result from the dissolution of a soluble alkali metal bicarbonate and the transition metal ions result from the dissolution of nickel chloride.

11. A process as in claim 9 wherein the bicarbonate ions result from the dissolution of about 1 to about 20 gram moles per liter of a soluble alkali metal bicarbonate and the transition metal ions result from the dissolution of from about 1 part by wieght of a soluble transition metal salt per 50 parts by weight of hydrogen sulfide to about 1 part by weight of a soluble transition metal salt to about 200 parts by weight of hydrogen sulfide.

12. A process as in claim 11 wherein the soluble alkali metal bicarbonate is sodium bicarbonate and the soluble transition metal salt is nickel chloride.

13. A process as in claim 9 wherein the bicarbonate ions result from the reaction of carbonate ions and carbon dioxide in an aqueous medium.

14. A process for converting hydrogen sulfide to elemental sulfur wherein the hydrogen sulfide is originally present in a gas mixture consisting of hydrogen sulfide and carbon dioxide said process comprising treating the gas mixture comprising hydrogen sulfide and carbon dioxide at atmospheric pressure with an aqueous solution consisting of dissolved carbonate ions in sufficient concentration to establish an equilibrium imbalance to prevent substantial dissolution of carbon dioxide, a catalytic quantity of ions of a transition metal and dissolved oxygen.

15. A process for preferentially removing hydrogen sulfide from a gas mixture comprising hydrogen sulfide and carbon dioxide and converting the hydrogen sulfide to elemental sulfur comprising treating the gas mixture at atmospheric pressure with an aqueous solution consisting of dissolved bicarbonate ions in sufficient concentration to establish an equilibrium imbalance to prevent substantial dissolution of carbon dioxide to preferentially dissolve the hydrogen sulfide and treating the said aqueous solution containing hydrogen sulfide with oxygen in a catalytic quantity of transition metal ions dissolved in an aqueous medium to convert the hydrogen sulfide to elemental sulfur.

16. A process for preferentially removing hydrogen sulfide from a gas mixture consisting of hydrogen sulfide and carbon dioxide and converting the hydrogen sulfide to elemental sulfur comprising treating said gas mixture at atmospheric pressure with an aqueous solution consisting of dissolved bicarbonate ions in sufficient concentration to establish an equilibrium imbalance to prevent substantial dissolution of carbon dioxide, a catalytic quantity of ions of a transition metal and dissolved oxygen.

* * * * *